United States Patent Office 3,706,802
Patented Dec. 19, 1972

3,706,802
N-(2,2-DI-SUBSTITUTED-VINYL)-ARYLIMINES
Joseph T. Arrigo, Mount Prospect, Ill., assignor to Universal Oil Products Company, Des Plaines, Ill.
No Drawing. Filed Sept. 26, 1969, Ser. No. 861,455
Int. Cl. C07c 119/00
U.S. Cl. 260—566 F     7 Claims

ABSTRACT OF THE DISCLOSURE

A novel compound of the following formula

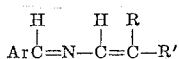

where Ar is aryl and R and R' are hydrocarbyl or together form a carbocyclic ring. These novel compounds are prepared by reacting an arylaldehyde with an N-(2,2-dihydrocarbylethylidene) - 2,2 - dihydrocarbylvinylamine or an N,N' - bis - (2,2 - dihydrocarbylethylidene) - 2,2 - dihydrocarbylethylidenediamine. These compounds are useful as metal deactivators, antiozonants, etc.

DESCRIPTION OF THE INVENTION

In one embodiment the present invention is directed to a novel compound of the following formula

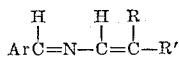

where Ar is aryl and R and R' are hydrocarbyl containing up to about 15 carbon atoms or together form a carbocyclic ring containing up to about 12 carbon atoms.

In a preferred embodiment R and R' are independently selected from alkyl, cycloalkyl, alkenyl, cycloalkenyl, aryl, aralkyl and alkaryl. As set forth above, each of these substituents contains up to about 15 carbon atoms.

The novel compounds of the present invention are prepared by the reaction of an arylaldehyde with an N-(2,2-dihydrocarbylethylidene) - 2,2 - dihydrocarbylvinylamine, hereinafter referred to as an enimine, or with an N,N'-bis-(2,2 - dihydrocarbylethylidene) - 2,2 - dihydrocarbylethylidenediamine, hereinafter referred to as a hydroamide. Any suitable arylaldehyde is used as a reactant in accordance with the present invention. Preferably the arylaldehyde is benzaldehyde or a substituted benzaldehyde in which the substituent group or groups are substantially inert under the reaction conditions. Illustrative substituents comprise one or more of hydrocarbyl including alkyl of 1 to 15 carbon atoms, alkenyl of one to 15 carbon atoms, cycloalkyl containing from 3 to 12 carbon atoms in the ring, alkylcycloalkyl containing 1 to 15 carbon atoms in the alkyl and 3 to 12 carbon atoms in the ring, cycloalkenyl containing from 3 to 12 carbon atoms in the ring, alkylcycloalkenyl containing 1 to 15 carbon atoms in the alkyl and 3 to 12 carbon atoms in the ring, aryl, alkaryl containing 1 to 15 carbon atoms in the alkyl, aralkyl containing 1 to 15 carbon atoms in the alkyl, etc. In another embodiment the substituents include one or more of hydroxy, hydroxyalkyl containing 1 to 15 carbon atoms in the alkyl, hydroxycycloalkyl containing 3 to 12 carbon atoms in the ring, hydroxyaryl, alkoxy containing up to 15 carbon atoms, chloro, bromo, iodo or fluoro, heterocyclic oxygen ring, heterocyclic nitrogen ring, heterocyclic sulfur ring, etc. It is understood that the above are illustrative and that any substituent which is substantially inert under the reaction conditions may be attached to the arylaldehyde. In any event it is preferred that the aliphatic constituent contains from 1 to 15 carbon atoms and the ring substituent contains from 3 to 13 carbon atoms in the ring.

As hereinbefore set forth any suitable arylaldehyde is used as a reactant in the present invention. Illustrating but not limiting arylaldehydes, include benzaldehyde, tolualdehyde, ethylbenzaldehyde, propylbenzaldehyde, butylbenzaldehyde, pentylbenzaldehyde, hexylbenzaldehyde, heptylbenzaldehyde, octylbenzaldehyde, nonylbenzaldehyde, decylbenzaldehyde, undecylbenzaldehyde, dodecylbenzaldehyde, tridecylbenzaldehyde, tetradecylbenzaldehyde, pentadecylbenzaldehyde, dimethylbenzaldehyde, methylethylbenzaldehyde, diethylbenzaldehyde, methylpropylbenzaldehyde, ethylpropylbenzaldehyde, dipropylbenzaldehyde, methylbutylbenzaldehyde, ethylbutylbenzaldehyde, propylbutylbenzaldehyde, dibutylbenzaldehyde, methylpentylbenzaldehyde, ethylpentylbenzaldehyde, propylpentylbenzaldehyde, butylpentylbenzaldehyde, dipentylbenzaldehyde, methylhexylbenzaldehyde, ethylhexylbenzaldehyde, propylhexylbenzaldehyde, butylhexylbenzaldehyde, pentylhexylbenzaldehyde, dihexylbenzaldehyde, etc., vinylbenzaldehyde, allylbenzaldehyde, propenylbenzaldehyde, butenylbenzaldehyde, pentenylbenzaldehyde, hexenylbenzaldehyde, etc., salicylaldehyde, methylsalicylaldehyde, propylsalicylaldehyde, butylsalicylaldehyde, pentylsalicylaldehyde, hexylsalicylaldehyde, etc., vinylsalicylaldehyde, allylsalicylaldehyde, propenylsalicylaldehyde, butenylsalicylaldehyde, pentenylsalicylaldehyde, hexenylsalicylaldehyde, p-hydroxybenzaldehyde, chlorobenzaldehyde, methoxybenzaldehyde, ethoxybenzaldehyde, propoxybenzaldehyde, butoxybenzaldehyde, methoxysalicylaldehyde, ethoxysalicylaldehyde propoxysalicylaldehyde, butoxysalicylaldehyde, dialkylaminobenzaldehyde, naphthaldehyde, anthraldehyde, etc., vanillin, as well as arylaldehydes containing two aldehyde groups, preferably in the 1,4-positions, in which case the reaction may occur at both formyl groups.

As hereinbefore set forth, the arylaldehyde is reacted with an enimine or hydroamide. The enimine is an N-(2,2-dihydrocarbylethylidene) - 2,2 - dihydrocarbylvinylamine and may be represented by the general structural formula

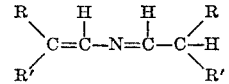

wherein R and R' are hydrocarbyl radicals independently selected from the group consisting of alkyl, cycloalkyl, alkenyl, cycloalkenyl, aryl, aralkyl and alkaryl, each containing up to about 15 carbon atoms, or R and R' attached to the same carbon atom may together form a carbocyclic ring containing up to about 12 carbon atoms. Illustrative N - (2,2-disubstitutedethylidene)-2,2-disubstitutedvinylamines thus include N-(2,2-dimethylethylidene)-2,2-dimethylvinylamine,
N-(2-methyl-2-ethylethylidene)-2-methyl-2-ethylvinylamine,
N-(2,2-diethylethylidene)-2,2-diethylvinylamine,
N-(2,2-dipropylethylidene)-2,2-dipropylvinylamine,
N-(2-methyl-2-propylethylidene)-2-methyl-2-propylvinylamine,
N-(2,2-dicyclopentylethylidene)-2,2-dicyclopentylvinylamine,
N-(2-methyl-2-cyclopentylethylidene)-2-methyl-2-cyclopentylvinylamine,
N-(2,2-dicyclohexylethylidene)-2,2-dicyclohexylvinylamine,
N-(2,2-divinylethylidene)-2,2-divinylvinylamine,
N-(2,2-dicyclopentenylethylidene)-2,2-dicyclopentenylvinylamine,
N-(2-methyl-2-allylethylidene)-2-methyl-2-allylvinylamine,
N-(2,2-diphenylethylidene)-2,2-diphenylvinylamine,
N-(2-methyl-2-phenylethylidene)-2-methyl-2-phenylvinylamine,
N-(2,2-dibenzylethylidene)-2,2-dibenzylvinylamine, N-(2-methyl-2-benzylethylidene)-2-methyl-2-benzylvinyl-
amine,
N-(2,2-di-p-tolylethylidene)-2,2-di-p-tolylvinylamine and
the like.

The hydroamide is named N,N'-bis-(2,2-dihydrocarbyl-
ethylidene)-2,2-dihydrocarbylethylidenediamine and may
be represented by the general structural formula

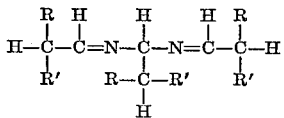

wherein R and R' have the same designations as herein-
before set forth in the description of the enimine. Illustra-
tive N,N' - bis - (2,2-disubstitutedethylidene)-2,2-disubsti-
tutedethylidenediamines thus include N,N'-bis-(2,2-dimethylethylidene)-2,2-dimethylethyli-
denediamine,
N,N'-bis-(2-methyl-2-ethylethylidene)-2-methyl-2-
ethylethylidenediamine,
N,N'-bis-(2,2-diethylethylidene)-2,2-diethylethylidenedi-
amine,
N,N'-bis-(2,2-dipropylethylidene)-2,2-dipropylethylidene-
diamine,
N,N'-bis-(2-methyl-2-propylethylidene)-2-methyl-2-
propylethylidenediamine,
N,N'-bis-(2,2-dicyclopentylethylidene)-2,2-dicyclopen-
tylethylidenediamine,
N,N'-bis-(2-methyl-2-cyclopentylethylidene)-2-methyl-
2-cyclopentylethylidenediamine,
N,N'-bis-(2,2-dicyclohexylethylidene)-2,2-dicyclo-
hexylethylidenediamine,
N,N'-bis-(2,2-divinyl-ethylidene)-2,2-divinylethylidene-
diamine,
N,N'-bis-(2,2-dicyclopentylethylidene)-2,2-dicyclo-
pentylethylidenediamine,
N,N'-bis-(2-methyl-2-allylethylidene)-2-methyl-2-allyl-
ethylidenediamine,
N,N'-bis-(2,2-diphenylethylidene)-2,2-diphenylethyli-
denediamine,
N,N'-bis-(2-methyl-2-phenylethylidene)-2-methyl-2-
phenylethylidenediamine,
N,N'-bis-(2,2-dibenzylethylidene)-2,2-dibenzylethyli-
denediamine,
N,N'-bis-(2-methyl-2-benzylethylidene)-2-methyl-2-
benzylethylidenediamine,
N,N'-bis-(2,2-di-p-tolylethylidene)-2,2-di-p-tolyl-
ethylidenediamine, and the like.

The aforementioned N-(2,2-dihydrocarbylethylidene)-
2,2-dihydrocarbylvinylamines and the aforementioned
N,N'-bis-(2,2 - dihydrocarbylethylidene)-2,2-dihydrocarb-
ylethylidenediamines can be prepared by any conven-
tional or convenient process. One preferred method com-
prises reacting an aldehyde, which can be described as a
2,2-dihydrocarbylacetaldehyde, and ammonia to form the
described N,N' - bis-(2,2-dihydrocarbylethylidene)-2,2-di-
hydrocarbylethylidenediamine which, when desired, is
thereafter treated at decomposition reaction conditions of
temperature and pressure to yield the desired N-(2,2-di-
hydrocarbylethylidene)-2,2-dihydrocarbylvinylamine. The
class of compounds herein described have been known
since 1881 when they were described by Lipp in Berichte,
14, 1746. Preparation, by passing an excess of gaseous am-
monia through alpha-branched-chain saturated aliphatic
aldehydes containing at least 5 carbon atoms at 20–25°
C., is described in U.S. Pat. 2,319,848 issued to Clark and
Wilson. The particular compounds utilized during the
course of the present work were prepared in accordance
with the method of Hasek, Elam and Martin, Journal of
Organic Chemistry, 26, 1822 (1961). For example, iso-
butyraldehyde is reacted with aqueous ammonium hy-
droxide solution at about 17–24° C. to form N,N'-bis-
(2,2-dimethylethylidene)-2,2 - dimethylethylidenediamine,
also known as N,N'-diisobutylidene-2-methyl-1,1-propane-
diamine, which is thereafter decomposed to yield the de-
sired N-(2,2-dimethylethylidene)-2,2-dimethylvinylamine.
The hydrocarbyl substituent groups of the aforementioned
2,2-dihydrocarbylacetaldehyde correspond to the hydro-
carbyl substituent groups desired. A more detailed prepara-
tion is described in the examples appended hereto.

The reaction of the present invention is readily effected
by heating the arylaldehyde and either the enimine or the
hydroamide for a sufficient time to complete the reaction.
The temperature may range from about 25° to about
300° C. and preferably from about 75° to about 250°
C. for a period of from about 1 to 6 hours or more. When
utilizing the enimine as a reactant, the stoichiometry re-
quires one mole proportion of arylaldehyde per one mole
proportion of enimine. When utilizing the hydroamide as
a reactant, the stoichiometry requires 2 mole proportions
of arylaldehyde per 1 mole proportion of the hydroamide.
It is understood that an excess of either reactant may be
used to insure completion of the reaction. When desired,
an insert solvent or diluent may be employed, as for
example, a saturated hydrocarbon such as decane, dode-
cane, Decalin, Tetralin or the like, or an ether, polyether,
alcohol, N,N-dialkylcarboxamide, etc., boiling in the de-
sired range. The reaction may be effected in any suitable
manner and may comprise a batch or continuous type
process. In a preferred method the arylaldehyde and eni-
mine or hydroamide and solvent, when used, are refluxed
in an unpacked zone or a zone containing inert packing
material such as glass chips, or beads or the like. Either
continuously during the reaction or subsequently, an ali-
phatic aldehyde formed as a product of the reaction is
separated in any suitable manner as by distillation, flash-
ing, etc.

The reaction may be illustrated by the following equa-
tions. For simplification purposes, R and R' in the formula
hereinbefore set forth are methyl radicals and hydrogen
atoms are omitted. When employing an enimine as the
reactant, the equation is illustrated as follows:

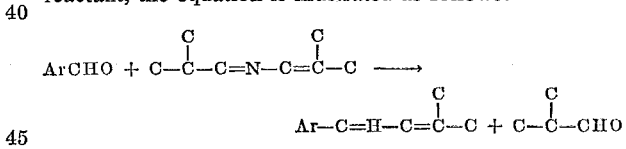

When employing a hydroamide as the reactant, the reac-
tion may be illustrated by the following equation.

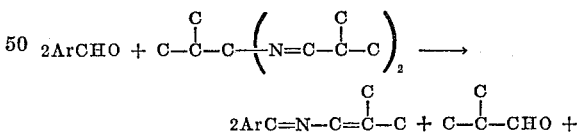

The novel compounds of the present invention will have
varied utility. In one embodiment these compounds are
useful as metal deactivators and will form chelates with
metals and particularly copper in organic substrates such
as gasoline, solvent oil, fatty material, etc. These com-
pounds also will serve as antioxidants to retard deteriora-
tion of various organic materials such as hydrocarbon
distillates, plastics or other organic substrates which are
normally subject to oxidative deterioration, either as such
or induced by ultraviolet light. These compounds also
will serve as antiozonants to retard deterioration of mate-
rials normally subject to ozone induced reactions. It is
readily apparent that these compounds also will serve as
organic intermediates in the preparation of detergents,
bactericides, pesticides, fungicides, etc. or as monomers
in the preparation of polymers and copolymers. It is
understood that the particular compound will be selected
with reference to the specific function desired.

The following examples are introduced to illustrate
further the novelty and utility of the present invention
but not with the intention of unduly limiting the same.

EXAMPLE I

As hereinbefore set forth the enimine and hydroamide may be prepared in any suitable manner. This example is a typical preparation of a particular hydroamide. The hydroamide of this example is N,N'-bis-(2,2-dimethylethylidene) - 2,2 - dimethylethylidenediamine, otherwise named as N,N'-diisobutylidene-2-methyl-1,1-propanediamine. In this preparation, 715 grams of isobutyraldehyde was added to a stirred solution of 664 grams of concentrated ammonium hydroxide in 377 grams of water over a period of 1.5 hours. The reaction temperature was maintained at 17–24° C. After the isobutyraldehyde addition was completed, stirring was continued for an additionl 1.5 hours at 20° C. The aqueous phase of the reaction mixture was then separated, ether-extracted, and the ether extract was added to the organic phase of the reaction mixture. The total organic phase was thereafter water-washed, dried over potassium hydroxide and distilled at reduced pressure. About 609 grams of crude N,N'-bis-2,2 - dimethylethylidene)-2,2-dimethylethylidenediamine, equivalent to a 94% yield, was recovered. A portion of the product was redistilled through a Minical column to yield a purified product boiling at 41° C. at 0.7 mm. (208° C. corrected to 760 mm.), with a refractive index of 1.4386 at 21° C.

EXAMPLE II

The enimine corresponding to the hydroamide of Example I was prepared by pyrolyzing a portion of the hydroamide prepared according to Example I. In this preparation, 481 grams of the N,N'-bis-(2,2-dimethylethylidene)-2,2-dimethylethylidenediamine was slowly distilled through a 24-inch column packed with wire mesh to yield 394 grams (85% yield) of N-(2,2-dimethylethylidene)-2,2-dimethylvinylamine, boiling chiefly at 141–143° C., a heart-cut which had a refractive index of 1.4595 at 22 °C.

EXAMPLE III

In this example, N,N'-bis-(2-methyl-2-ethylethylidene)-2-methyl-2-ethylethylidenediamine was prepared by the procedure of Example I using 8.28 moles of 2-methylbutyraldehyde. About 540 grams of N,N'-bis-(2-methyl-2-ethylethylidene) - 2-methyl-2-ethylethylidenediamine was recovered by vacuum distillation. Redistillation through a Minical column yielded product boiling at 259–265° C. (corrected to 760 mm.) having a refractive index of 1.4498–1.4540 at 21° C.

EXAMPLE IV

The enimine corresponding to the hydroamide of Example III was prepared as follows. A 435 gram sample of N,N'-bis-(2 - methyl-2-ethylethylidene)-2-methyl-2-ethylethylidenediamine was pyrolyzed in the same manner as described in Example II to yield 369 grams of crude N-(2-methyl-2-ethylethylidene)-2-methyl-2-ethylvinylamine. On redistillation through a Hypercal column, the product boiling at about 189° C. was recovered and had a refractive index of 1.4650–1.4656 at 21° C.

EXAMPLE V

This example describes the reaction of salicylaldehyde and N-(2,2-dimethylethylidene)-2,2-dimethylvinylamine. The reaction was effected as follows. Salicylaldehyde (97.4 g., 0.80 mole—an excess was used in this run) was refluxed together with N-(2,2-dimethylethylethylidene)-2,2-dimethylvinylamine (24.7 g., 0.20 mole) for 1.3 hours at 80–132° C. and then 13.5 g. of isobutyraldehyde (95% of theoretical) was distilled from the reaction mixture. Vacuum distillation of the residual material afforded 18.6 g. (55% yield) of product B.P. 89° C. at 0.5 mm., which on recrystallization from aqueous methanol gave lemon-yellow needles, M.P. 61–62° C. The product was identified as N-salicylal-2-methylpropenylamine.

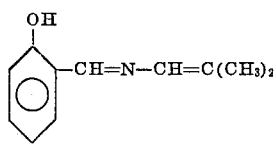

EXAMPLE VI

This example describes the reaction of benzaldehyde and N-(2,2-dimethylethylidene)-2,2-dimethylvinylamine, the latter referred to herein as EI. The reaction was effected as follows. Benzaldehyde (21.8 g., 0.20 mole) and EI (25.1 g., 0.20 mole) were mixed and refluxed for 3 hours at 140–260° C. with isobutyraldehyde (90% of theoretical) being distilled off as formed. The remainder of the reaction mixture was distilled through a 10" Vigreux column and appropriate cuts were combined and vacuum-fractionated through a Minical spinning band column to afford 14.3 g. (45% yield) of deep-yellow product, B.P. 56° C. at 0.3 mm., $n_D^{23}$ 1.6021. The product was identified as N-benzal-2-methylpropenylamine.

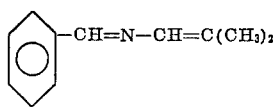

EXAMPLE VII

This example describes the reaction of 3-ethoxysalicylaldehyde and EI. A mixture of 30.4 g. (0.18 mole) of 3-ethoxysalicylaldehyde and 22.2 g. (0.18 mole) of EI was refluxed for 2 hours at 130–239° C. A total of 72% of the theoretical amount of isobutyraldehyde was distilled off as formed. The reaction mixture was distilled through a 10" Vigreux column to afford crude product cuts, B.P. 130–140° C. at 0.4 mm. Recrystallization from aqueous methanol afforded 13 g. (33% yield of orange needles (M.P. 82–84° C.) which proved to be N-(2-hydroxy-3-ethoxybenzal)-2-methylpropenylamine.

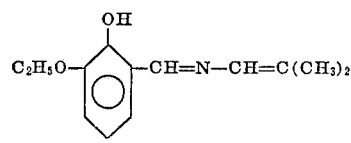

EXAMPLE VIII

This example describes the reaction of 3-allylsalicylaldehyde and EI and was effected as follows. A mixture of 32.6 (0.20 mole) of 3-allylsalicylaldehyde and 25.3 g. (0.20 mole) of EI was refluxed for 4.7 hours at 155–250° C., 50% of the theoretical amount of isobutyraldehyde being distilled off as formed. The remainder of the product was distilled through a 10" Vigreux column and appropriate cuts were combined and vacuum-fractionated through a Minical column to afford 12 g. (28% yield) of yellow product B.P. 106° C. at 0.2 mm., $n_D^{22}$ 1.5904, which proved to be N-(2-hydroxy-3-allylbenzal)-2-methylpropenylamine.

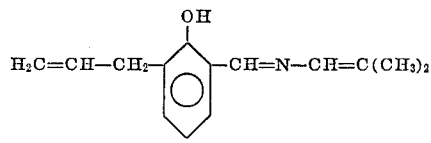

In addition to the above product, about a 9% yield of a compound B.P. 80° C. at 3 mm., $n_D^{22}$ 1.5371 was also formed which presumably is the coumaran arising from ring closure of the allylphenol moiety of the major product. Another product isolated in 8% yield had B.P. 115° C. at 0.2 mm. $n_D^{22}$ 1.5491 and corresponds to the 1,3 2H-benzoxazine derivative formed by a cyclization reaction of the unsaturated N-containing side-chain and the phenolic hydroxyl of the major product.

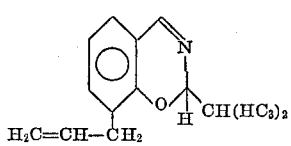

H₂C=CH—CH₂

EXAMPLE IX

As hereinbefore set forth, either EI or HA may be employed as a reactant. This example describes the use of HA as a reactant. This reaction was effected as follows. A mixture of 24.5 g. (0.20 mole) of salicylaldehyde and 19.6 g. (0.10 mole) of N,N'-bis-(2,2-dimethylethylidene)-2,2-dimethylethylidenediamine (the latter referred to herein as HA) was refluxed for 2.7 hours at 103–106° C. and the resulting product was then distilled through a 10″ Vigreux column. There were obtained the theoretical amounts of isobutyraldehyde and water, and a 55% yield of N-salicylal-2-methylpropenylamine was isolated. Thus HA gave results identical with those of EI in Example V. However, the detailed mechanism of the reaction appears to be quite different.

EXAMPLE X

The hydroamide prepared as described in Example III is reacted with salicylaldehyde in substantially the same manner as described in Example IX. The product is N-salicylal-2-methylbutenylamine.

EXAMPLE XI

N - salicylal - 2-methylpropenylamine prepared as described in Example V is used as a metal deactivator in gasoline. The compound is incorporated in a concentration of 0.03% by weight in a thermal cracked gasoline and serves to deactivate the deleterious effect of copper present in the gasoline.

EXAMPLE XII

N-benzal-2-methylpropenylamine, prepared as described in Example VI, is used as an antiozonant in butadiene-styrene-rubber. The additive is incorporated in a concentration of 4 parts per 100 parts of rubber hydrocarbon and serves to retard cacking of the rubber which othewise occurs upon exposure to ozone.

I claim as my invention:

1. An N - (hydroxybenzal)-2-alkyl-1-alkenylamine of the following formula:

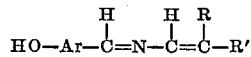

where R and R' are alkyl containing 1 to 15 carbon atoms each, and Ar is phenyl not further substituted or having at least one additional nuclear substituent selected from the group consisting of hydroxy, alkoxy containing 1 to 15 carbon atoms, alkyl containing from 1 to 15 carbon atoms, and alkenyl containing from 1 to 15 carbon atoms.

2. A compound of claim 1 being a N-salicylal-2-alkyl-1-alkenylamine.

3. A compound of claim 2 being N-salicylal-2-methylpropenylamine.

4. A compound of claim 1 being a N-(2-hydroxy-3-alkoxybenzal)-2-alkyl-1-alkenylamine.

5. A compound of claim 4 being N-(2-hydroxy-3-ethoxybenzal)-2-methylpropenylamine.

6. A compound of claim 1 being a N-(2-hydroxy-3-alkenylbenzal)-2-alkyl-1-alkenylamine.

7. A compound of claim 6 being N-(2-hydroxy-3-allyl-benzal)-2-methylpropenylamine.

References Cited

UNITED STATES PATENTS 2,155,356    4/1939    Britton et al. _____ 260—566 F

OTHER REFERENCES

Beilstein's Handbuch der Organische Chemie, vol. 8, p. 120 (1931).

LEON ZITVER, Primary Examiner

G. A. SCHWARTZ, Assistant Examiner

U.S. Cl. X.R.

252—401; 260—438.1